United States Patent [19]
Yasui

[11] Patent Number: 5,692,780
[45] Date of Patent: Dec. 2, 1997

[54] COLLISION ENERGY ABSORBING STRUCTURE OF VEHICLE SEAT BELT DEVICE

[75] Inventor: Shinichi Yasui, Nagoya, Japan

[73] Assignee: Toyota Jidosha Kabushiki Kaisha, Toyota, Japan

[21] Appl. No.: 654,276

[22] Filed: May 28, 1996

[30] Foreign Application Priority Data

May 29, 1995 [JP] Japan ................. 7-152722

[51] Int. Cl.⁶ ......................................... B60R 22/00
[52] U.S. Cl. .............. 280/801.2; 280/808; 297/483
[58] Field of Search ............. 280/801.2, 801.1, 280/808; 297/483, 468

[56] References Cited

U.S. PATENT DOCUMENTS

| | | |
|---|---|---|
| 3,779,595 | 12/1973 | Suzuki et al. . |
| 4,547,018 | 10/1985 | Cunningham ............... 297/483 |
| 4,556,255 | 12/1985 | Kawai ......................... 297/483 |
| 4,569,537 | 2/1986 | Else ........................... 280/801.2 |
| 4,652,012 | 3/1987 | Biller et al. ................. 280/801.2 |
| 4,786,081 | 11/1988 | Schmidt ...................... 280/801.2 |
| 5,149,136 | 9/1992 | Mackawa et al. ........... 280/801.2 |
| 5,163,730 | 11/1992 | Welch . |
| 5,280,959 | 1/1994 | Nanbu ......................... 280/808 |

FOREIGN PATENT DOCUMENTS

| | | |
|---|---|---|
| 0 250 731 | 1/1988 | European Pat. Off. . |
| 2590215 | 5/1987 | France ..................... 280/801.2 |
| 91 13 579 | 1/1992 | Germany . |
| 44 05 106 | 8/1994 | Germany . |
| 61-196156 | 12/1986 | Japan . |
| 2-34368 | 3/1990 | Japan . |
| 2-237873 | 9/1990 | Japan . |
| 4-13453 | 2/1992 | Japan . |
| 4-130568 | 11/1992 | Japan . |
| 7-172265 | 7/1995 | Japan . |

*Primary Examiner*—Christopher P. Ellis
*Attorney, Agent, or Firm*—Cushman Darby & Cushman IP Group of Pillsbury Madison & Sutro LLP

[57] ABSTRACT

A collision energy absorbing structure of a vehicle seat belt device is provided with a guide rail, a slider, and a slip joint. The guide rail (14) includes a vertically extending slit (20) and a pair of flanges (24, 25) which make resistance against deformation of the guide rail in the inward direction of the passenger compartment. The slider (16) is attached to the guide rail with nails (50) deformable under a load larger than a predetermined one in the outward direction of the passenger compartment and disposed in the guide rail outward thereof. The slip joint (18) is attached to the slider and disposed in the guide rail inward thereof.

5 Claims, 5 Drawing Sheets

COLLISION ENERGY ABSORBING STRUCTURE OF VEHICLE SEAT BELT DEVICE

BACKGROUND OF THE INVENTION

1. Field of the Invention

This invention relates to a collision energy absorbing structure of a vehicle seat belt device, and more particularly to a structure for absorbing collision energy applied on a slider in a vehicle seat belt device which includes a guide rail disposed in a vehicle pillar in the inward direction of a passenger compartment and the slider movable along the guide rail and which is capable of adjusting the height for supporting the seat belt.

2. Description of the Related Art

A vehicle pillar, formed by an inner panel and an outer panel such that its section cut on a horizontal imaginary plane shows a closed construction, has a good rigidity. Therefore, in view of a fear that a great impact might be exerted from the pillar when a vehicle collision occurs, a structure was proposed (JP Patent Application No. 5-394676) for absorbing a collision energy by providing an energy absorbing space between a guide rail of a height-adjustable seat belt device and the inner panel of the pillar and by attaching the guide rail to the inner panel in a readily deformable state, passing a bolt through a long hole opened at least at one of two ends of the guide rail, so that when a collision occurs, the guide rail is deformed within the energy absorbing space for absorbing the collision energy.

SUMMARY OF THE INVENTION

In the foregoing collision energy absorbing structure, when an outward collision energy is exerted on the guide rail, the guide rail is deformed in the outward direction of a passenger compartment to absorb a collision energy. However, it is not meant for particularly providing means to prevent the guide rail from being deformed in the inward direction of the passenger compartment. Therefore, when an inward collision energy is exerted from the seat belt on the guide rail, the guide rail tends to be deformed in the inward direction of the passenger compartment, so that an initial restraining performance of the seat belt might be influenced to some extent.

An object of the present invention is to provide a collision absorbing structure of a vehicle seat belt device which has a good rigidity against an inward collision energy exerted from the seat belt on the guide rail and which can absorb an outward collision energy.

The present invention relates to a collision energy absorbing structure of a vehicle seat belt device capable of adjusting upwardly and downwardly, or vertically the position for supporting the seat belt. This collision energy absorbing structure comprises a guide rail to be attached to a vehicle body having a vertically extending slit and a rib extending along the slit to be a resistance against a deformation of the guide rail in the inward direction of the passenger compartment; a slider attached to the guide rail with nails deformable by a load larger than a predetermined one in the outward direction of the passenger compartment, the slider being disposed in the guide rail outward thereof so as to move along the guide rail and so as to be fixed at the guide rail; and a slip joint attached to the slider by fitting means, which passes through the slit of the guide rail, to be disposed in the guide rail inward thereof.

In a preferred embodiment, the guide rail has a plurality of lock holes provided along the slit, and the slip joint has an operating button for moving the slider. The slider has a lock plate supported swingably by the slider, the lock plate having a pusher portion which can be pushed in the outward direction of the passenger compartment by operating the operating button and lock portions which can be fitted into the lock holes of the guide rail and can be pulled out of the lock holes when the pusher portion is pushed in the outward direction of the passenger compartment, and a spring functioning to maintain the lock portions of the lock plate to be fitted into the lock holes of the guide rail.

In another preferred embodiment, the rib of the guide rail, protruding in the inward direction of the passenger compartment, consists of a pair of flanges positioned, interposing the slit. These flanges are inclined to the inner side surface of the guide rail and deformable when the slip joint is displaced in the outward direction of the passenger compartment due to a load larger than a predetermined one.

According to the invention, when an outward load, that is, a load larger than a predetermined one in the outward direction of the passenger compartment is exerted on the slider of the seat belt device, nails of the slider are deformed to absorb a collision energy. However, when an inward load, that is, a great load in the inward direction of the passenger compartment is exerted on the slider from the seat belt, the rib of the guide rail becomes a resistance and stops the deformation of the guide rail in the inward direction of the passenger compartment.

The collision energy can be absorbed by deformation of the nails of the slider, and besides, the amount of the collision energy to be absorbed can be adjusted by changing the size of the nails. Also, since the deformation of the guide rail in the inward direction of the passenger compartment is stopped by the rib, the initial restraining performance of the seat belt device is not only uninfluenced but also can be enhanced by the good rigidity due to the rib.

According to one aspect of the invention, when the operating button of the slip joint is operated, the lock portions of the slider is pulled out of the lock holes of the guide rail, so that the slider can move vertically along the guide rail.

According to the invention, besides the aforementioned effects, the number of parts can be greatly reduced to realize a low cost and improvement in operability for assembling.

According to another aspect of the invention, when a load is exerted on the slip joint and the slider in the outward direction of the passenger compartment, the nails of the slider are deformed to absorb a collision energy. Thereafter, the pair of flanges of the guide rail are deformed by the slip joint, thereby absorbing the collision energy.

According to the invention, the collision energy is absorbed in two stages to reduce a peak load, so that a nearly ideal energy absorption characteristic can be achieved.

shows a state where the slider is fixed and (b) shows a state where the slider is movable along the guide rail.

FIG. 5 is a schematic diagram showing a major portion of another embodiment of the collision energy absorbing structure of a vehicle seat belt device relative to the present invention, wherein (a) shows the state before the flanges are deformed and (b) shows the state where the flanges are deformed.

Figure 6:
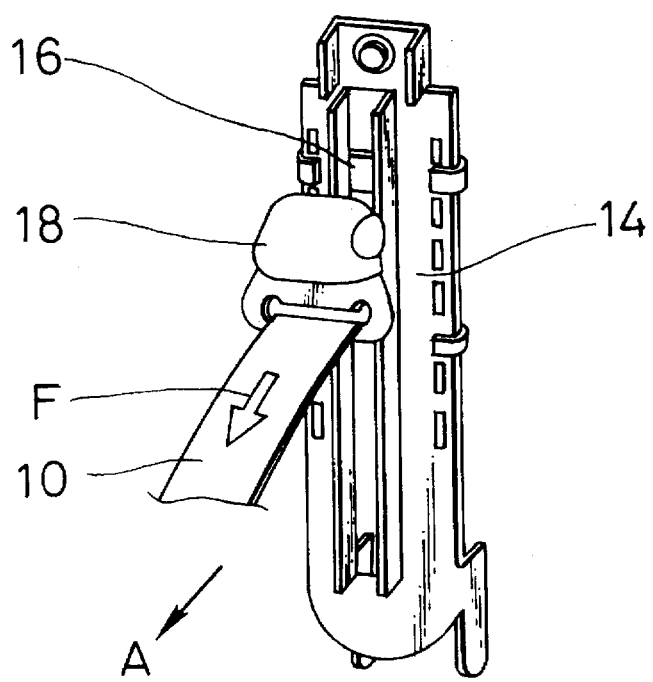

FIG. 6 is a perspective view showing a function of the collision energy absorbing structure of a vehicle seat belt device relative to the present invention.

Figure 7:
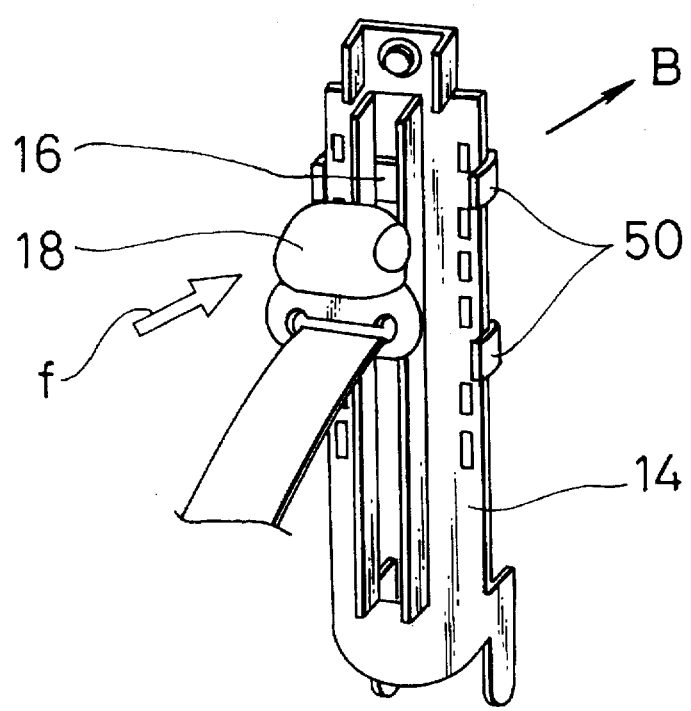

FIG. 7 is a perspective view showing a function of the collision energy absorbing structure of a vehicle seat belt device relative to the present invention.

Figure 8:
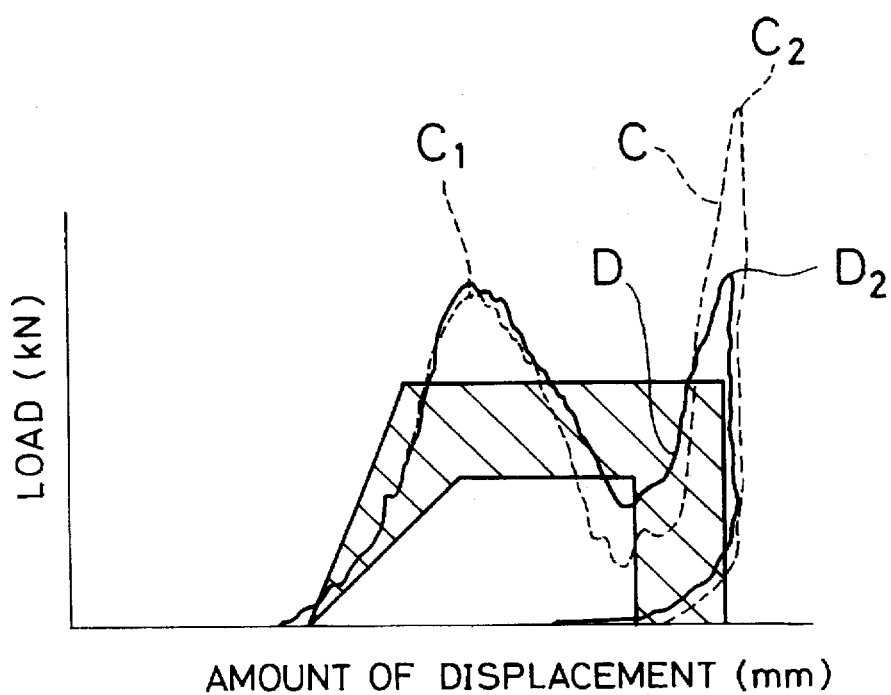

FIG. 8 is a characteristic view showing a characteristic of the load and the amount of displacement.

DESCRIPTION OF THE PREFERRED EMBODIMENTS

Figure 1:
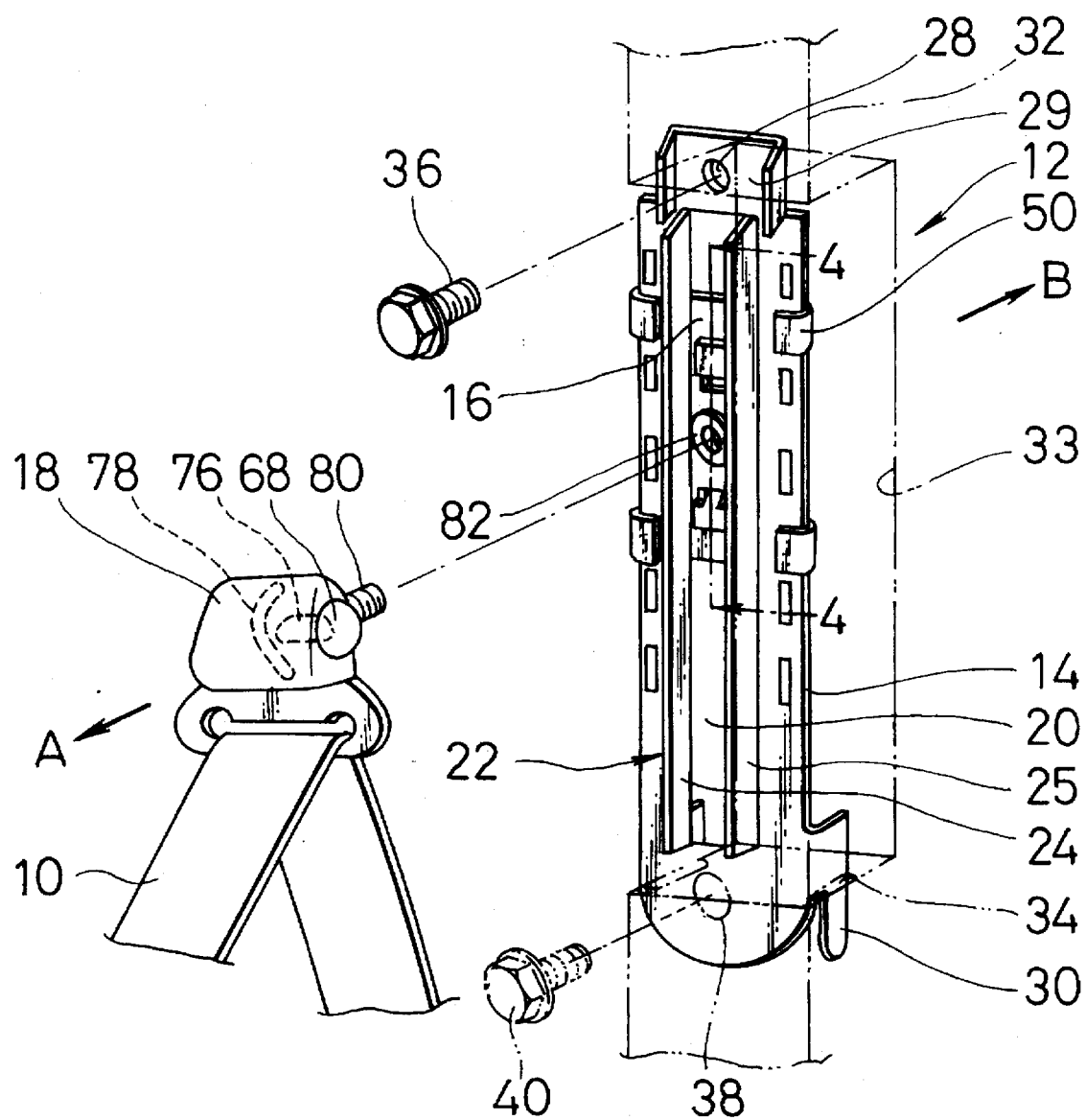
FIG. 1 is an exploded perspective view of an embodiment of a collision energy absorbing structure of a vehicle seat belt device relative to the present invention, showing a slip joint in a separate state.

With reference to FIG. 1 showing a perspectively viewed state of the embodiment, the collision energy absorbing structure absorbs a collision energy of the vehicle seat belt device 12 capable of adjusting a position for supporting the seat belt 10. The seat belt device 12 includes a guide rail 14, a slider 16 and a slip joint 18.

Figure 2:
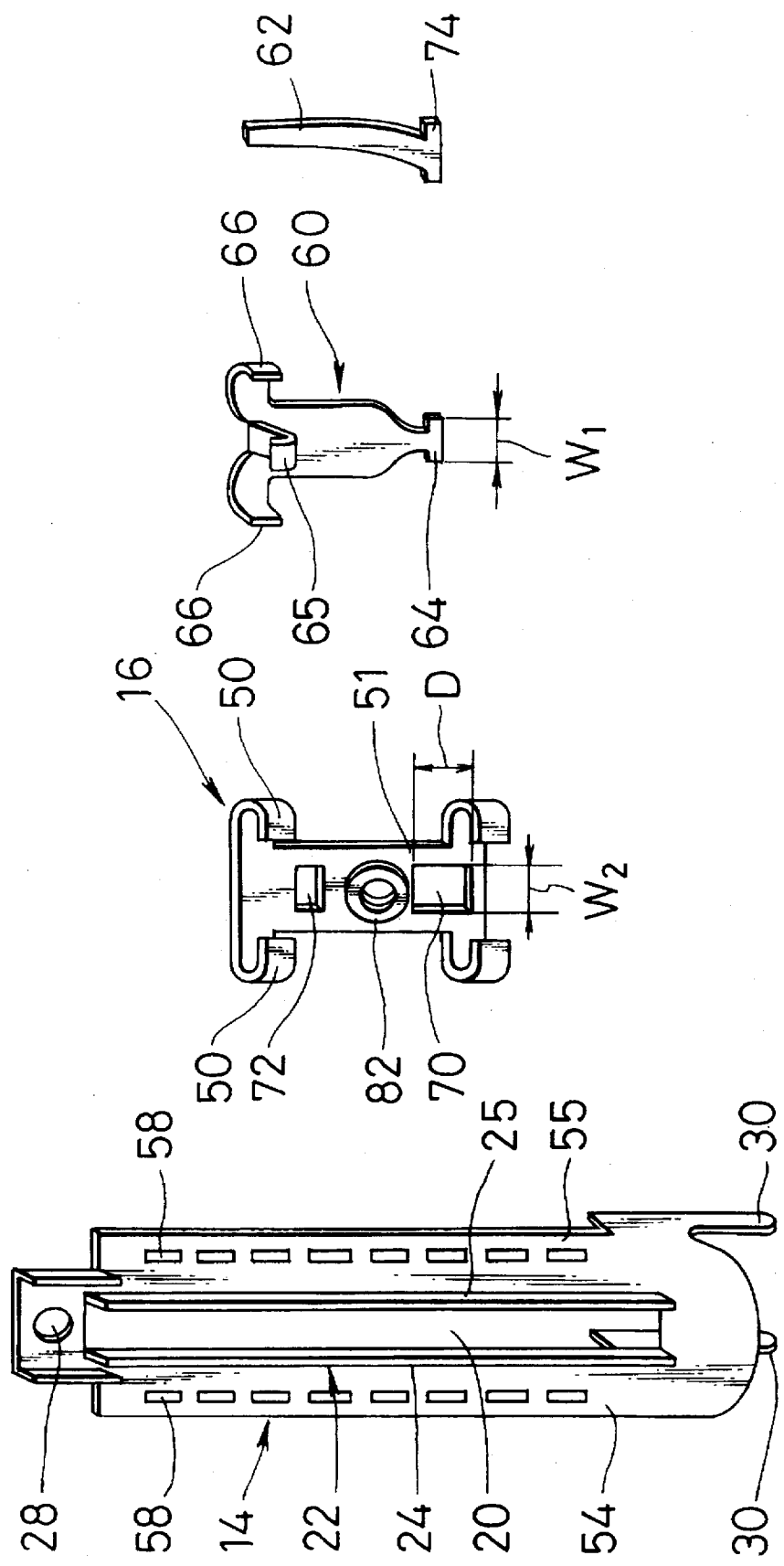
FIG. 2 is an exploded perspective view showing the guide rail, slider, the lock plate and the spring used in the collision energy absorbing structure of FIG. 1.

With reference to FIGS. 1 and 2 respectively showing exploded states, a guide rail 14 includes a vertically extending slit 20 and a rib 22 extending along the slit 20, the rib 22 becoming a resistance against deformation of the guide rail 14 in the inward direction A of the passenger compartment.

According to the illustrated embodiment, the guide rail 14 is made by press-molding a steel plate, and the rib 22 consists of a pair of flanges 24, 25. The flanges 24, 25, made by stamping out the slit 20 and raising the material there like a folding double door, are positioned, interposing the slit 20. The flanges 24, 25 are protruded in the inward direction A of the passenger compartment and has the same vertical length as the slit 20. Into the slit 20 fitting means mentioned later is inserted. The pair of flanges may be shaped to protrude in the outward direction B of the passenger compartment, contrary to the embodiment.

The guide rail 14 is further provided with a fitting hole 28 at its upper portion and a pair of insertions 30 at its lower portion. A concave portion 33 is provided in the vehicle body, for example, in a center pillar 32, and in the lower end of the concave portion 33 a hole 34 is opened for inserting each of the pair of insertions 30. To attach the guide rail 14 to the center pillar 32, the guide rail 14 is erected after each insertion 30 is inserted into the hole 34 at an angle, and the circumferential portion of the fitting hole 28 is applied to the center pillar 32. Then, a bolt 36 is passed through the fitting hole 28 to be screwed into a nut (not shown) in the center pillar 32.

The insertion 30 and the hole 34 are preferably formed to fit each other, thereby to prevent the attached guide rail 14 from getting loose and rattling. The connection of the insertion 30 and the hole 34 can make the attachment of the guide rail 14 to the center pillar 32 firm. Instead of providing the insertion 30, however, it is possible to open a fitting hole 38 at the lower end portion of the guide rail 14 in advance and screw into a nut a bolt 40 to be passed through the fitting hole 38.

Figure 3:
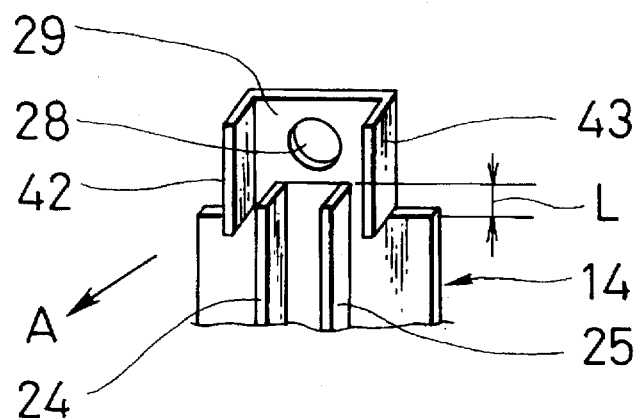
FIG. 3 is an enlarged perspective view showing the upper end of the guide rail used in the collision energy absorbing structure of FIG. 1.

In the illustrated embodiment, with reference to FIG. 3 showing the upper end portion of the guide rail 14, both side portions 42, 43 of the circumferential portion 29 of the fitting hole 28 in the guide rail 14 are bent in the same direction as the flanges 24, 25, and furthermore, the rigidity of the circumferential portion 29 is enhanced in a predetermined bending range such that these side portions 42, 43 are overlapped with the flanges 24, 25 over a length L. As a result, the rigidity is enhanced at the upper portion of the guide rail 14 by the side portions 42, 43, and at the intermediate portion by the flanges 24, 25, and at the lower portion by the pair of insertions 30, so that the guide rail 14 has a great resistance against the deformation in the inward direction A of the passenger compartment.

The slider 16 is, as fully shown in FIG. 2, attached to the guide rail 14 with nails 50 which are deformable under a load over a predetermined one in the outward direction B of the passenger compartment and are disposed in the guide rail 14 outward thereof. In the illustrated embodiment, four nails 50 are provided at the four corners of a rectangular slider body 51. The nails 50 are bent in such a manner as to embrace the side portions 54, 55 of the guide rail 14 from the backward. The required number of the nails 50 can be determined by the size of a set load and the thickness of the slider 16. The slider 16, when mounted on the guide rail 14, can move along the guide rail 14 and can be fixed to the guide rail 14.

In the illustrated embodiment, the guide rail 14 has a plurality of lock holes 58 provided along the slit 20 at vertical intervals in the side portions 54, 55. On the other hand, the slider 16 has a lock plate 60 supported swingably by the slider 16 and a spring 62. The lock plate 60 has a fulcrum portion 64, a pusher portion 65 which can be pushed in the outward direction B of the passenger compartment by an operation of an operation button 68 (FIG. 1) of the slip joint 18, and two lock portions 66 which can be fitted into the lock holes 58 of the guide rail and can be pulled out of the lock holes 58 when the pusher portion 65 is pushed in the outward direction B of the passenger compartment. Thus, the two lock portions 66 are preferably fitted into the lock holes 58 provided in two rows. For example, it is possible to have one lock portion fitted into the lock holes provided in one row, but the illustrated embodiment can stabilize the locked state. The spring 62 functions to maintain the lock portions 66 of the lock plate 60 to be filled into the lock holes 58 of the guide rail 14.

With reference to FIGS. 2 and 4 showing a state of a cross section, the slider body 51 has two holes 70, 72. The lock plate 60 has a T-shaped configuration as a whole, the width $W_1$ of the fulcrum portion 64 being greater than the width $W_2$ of the hole 70 at the lower portion of the slider body 51 and smaller than the vertical length D of the hole 70. Therefore, by inclining the lock plate 60 approximately 90° from the illustrated position with the width of the fulcrum portion 64 positioned vertically, the fulcrum portion 64 is inserted into the hole 70 of the slider body 51, and the lock plate 60 is twisted to be approximately horizontal. Thereby, the fulcrum 64 is hooked on the slider body 51. Thereafter, when the lock plate 60 is made to stand approximately vertical, the pusher portion 65 fits into the hole 72 of the slider body 51, and the lock portions 66 fit into the lock holes 58 of the guide rail 14. The spring 62 is a leaf spring and has a fulcrum portion 74 with a structure similar to the fulcrum portion 64 of the lock plate 60. By disposing the spring 62 on the lock plate 60 outward thereof and hooking the fulcrum portion 74 on the hole 70 of the slider body 51, the spring 62 is brought into a close contact with the lock plate 60 as shown in FIG. 4 (a), and the lock plate 60 is biased in the inward direction A of the passenger compartment, maintaining the lock portions 66 to be fitted into the lock holes 58 of the guide rail 14.

Figure 4A:
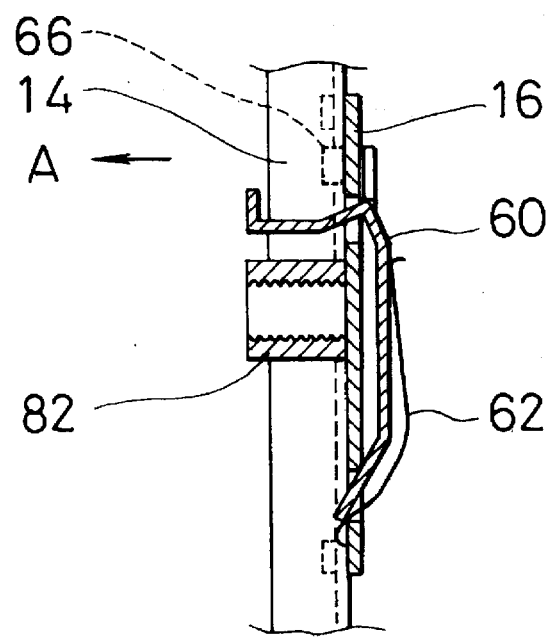
FIG. 4 is a sectional view taken along the line 4—4 of FIG. 1 showing the guide rail and the slider, wherein (a)
Figure 4B:
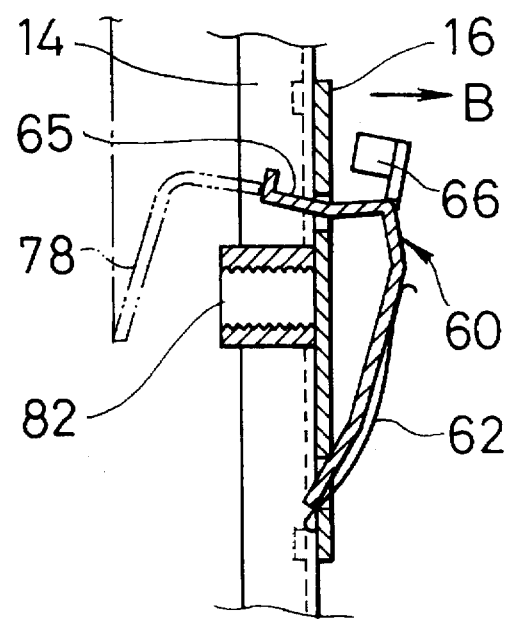

The slip joint 18 includes, as shown in FIG. 1, an operating button 68 for moving the slider. By pushing the operating button 68 downward with a finger, a cam 76 moves to push out the upper end portion of an L-shaped operating rod 78, which is swingable at the lower end portion as its fulcrum, in the outward direction B of the passenger compartment. This operating rod 78 abuts on the pusher portion 65 as shown in FIG. 4(b) and pushes the pusher portion 65 in the outward direction B of the passenger compartment. As a result, the lock portions 66 of the lock plate are pulled out of the lock holes of the guide rail 14, thereby enabling the slider 16 to move vertically. By removing the finger from the operating button 68, the cam 76 and the operating rod 78 return to their initial positions by an action of a spring (not shown), so that, as shown in FIG. 4(a), the lock plate 60 is pushed in the inward direction A of the passenger compartment by the spring 62, and the lock portions 66 are fitted into the lock holes of the guide rail 14.

As apparent from FIG. 2, the number of parts can be greatly reduced if moving and fixing of the slider 16 is performed by the lock plate 60 and the spring 62.

The slip joint 18 is attached to the slider 16 by fitting means 80 and disposed in the guide rail 14 inward of the passenger compartment. In the illustrated embodiment, the fitting means 80 is a bolt. With the bolt 80 screwed into a nut 82 which is fixed at the center of the slider 16, the slip joint 18 is attached to the slider 16 to support a seat belt 10.

It is necessary to position the slip joint 18 spaced away from the guide rail so that the slip joint 18, when attached to the slider 16, can be displaced in the outward direction B of the passenger compartment, and during the displacement the nails 50 can be deformed. To realize this, a long bolt 80 is formed so as to be screwed into the nut 82, or the nut 82 is formed so as to be inserted into the slit 20, interposing a cylindrical spacer (not shown) of a suitable size to be inserted into a slit 20, and the nut 82 is axially elongated. On the other hand, in order that the nails 50 may be deformed, a space is required between the slider 16 and the bottom surface of the concave portion 33 of the front pillar 32. In the present invention, however, since a collision energy is absorbed by deformation of the nails 50 and detachment of the nails 50 from the guide rail 14 which might occur subsequently, it is possible to make the space smaller than a case where a collision energy is absorbed by deformation of the entire guide rail 14.

Figure 5A:
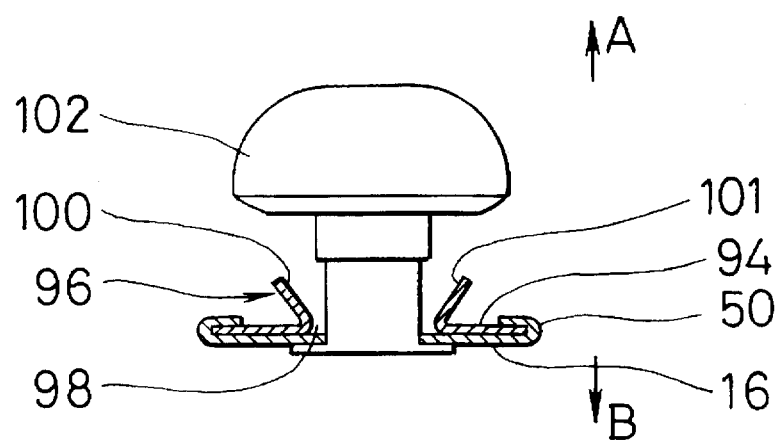

In the embodiment shown in FIG. 5(a), the rib 96 of the guide rail 94 is projected in the inward direction A of the passenger compartment and consists of a pair of flanges 100, 101 positioned with a slit 98 interposed. These flanges 100, 101 are inclined relative to the inner side surface of the guide rail 94 and are deformable when the slip joint 102 is displaced in the outward direction B of the passenger compartment under a load larger than a predetermined one. Otherwise, the constitution of this embodiment is substantially the same as that of the aforementioned embodiment.

The functions of the seat belt device are explained in the following with reference to FIGS. 6 through 8. When an inward load F is added to the seat belt 10 (FIG. 6), this load F acts on the guide rail 14 through the slip joint 18 and the slider 16, but since the guide rail 14 has a rib 22 (FIG. 1), deformation of the guide rail 14 in the inward direction A of the passenger compartment is prevented.

When a load f larger than a predetermined one in the outward direction B of the passenger compartment is added to the slip joint 18 (FIG. 7), the load f acts on the slider 16, deforms the nails 50 of the slider and detach the nails 50 from the guide rail 14, depending on the size of the load f. Thereby the collision energy is absorbed.

Figure 5B:
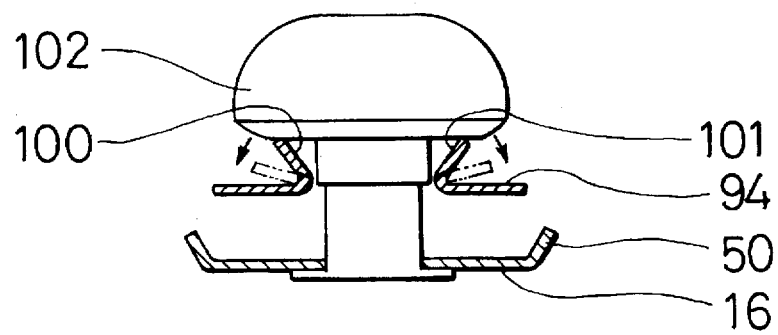

In the embodiment shown in FIG. 5(a), after the nails 50 of the slider 16 are deformed and detached from a guide rail 94, the flanges 100, 101 are deformed as shown by imaginary lines in FIG. 5(b) to further absorb the collision energy. With reference to FIG. 8 which shows the energy characteristic of a load and an amount of displacement, it is considered that, when the nails 50 are deformed to absorb the energy, the energy characteristic C reaches a first peak value $C_1$ due to the deformation of the nails 50 and reaches the maximum peak value $C_2$ as the slip joint 18 touches the bottom of the guide rail 14. This energy characteristic C tends to get out of the shadowed portion, which is an ideal portion, in that the maximum peak value $C_2$ is greatly deviated from the first peak value $C_1$. On the other hand, when the flanges 100, 101 are deformed after the deformation of the nails 50, the energy characteristic D reaches the first peak value $C_1$ due to the deformation of the flanges 100, 101 and then reaches the second peak value $D_2$. The second peak value $D_2$ is of about the same value as the first peak value $C_1$ but lower than the peak value $C_2$ at the time of touching the bottom. Also, the entire energy characteristic D approaches the ideal shadowed portion.

What is claimed is:

1. A collision energy absorbing structure of a vehicle seat belt device capable of upwardly and downwardly or vertically adjusting a position for supporting a seat belt, comprising:

a guide rail including an upwardly and downwardly or vertically extending slit and a rib extending along said slit to provide resistance against a deformation of the guide rail in the inward direction of a passenger compartment, the guide rail being attached to a vehicle body;

a slider attached to said guide rail with nails deformable under a load in the outward direction of the passenger compartment and larger than a predetermined load, the slider being disposed on said guide rail outwardly thereof and movable along said guide rail and fixable on said guide rail; and a slip joint for supporting said seat belt attached to said slider with fitting means passing through said slit of the guide rail and disposed in the guide rail inwardly thereof.

2. A collision energy absorbing structure of a vehicle seat belt device as claimed in claim 1, wherein said rib of said guide rail consists of a pair of flanges made by stamping out said slit and raising the material there like a folding double door, the flanges being positioned so as to interpose said slit.

3. A collision energy absorbing structure of a vehicle seat belt device as claimed in claim 2, wherein said guide rail is provided with a fitting hole at its upper portion and both side portions of the circumferential portions of said fitting hole are bent in the same direction as said flanges, said side portions being overlapped with said flanges over a certain length.

4. A collision energy absorbing structure of a vehicle seat belt device as claimed in claim 1, wherein: said guide rail has a plurality of lock holes provided along said slit; said slip joint has an operating button for moving said slider; said slider has a lock plate supported swingably by the slider, the lock plate including a pusher portion which can be pushed in the outward direction of the passenger compartment by operating said operating button and lock portions which can be fitted into the lock holes of said guide rail and can be pulled out of said lock holes when said pusher portion is pushed in the outward direction of the passenger compartment, and a spring functioning to maintain the lock portions of the lock plate in a state of being fitted into the lock holes of said guide rail.

5. A collision energy absorbing structure of a vehicle seat belt device as claimed in claim 1, wherein the rib of said guide rail consists of a pair of flanges projected in the inward direction of the passenger compartment and positioned, interposing said slit, these flanges being inclined against the inner side surface of said guide rail and deformable when said slip joint is moved in the outward direction of the passenger compartment under a load larger than a predetermined one.

\* \* \* \* \*